United States Patent
Shibata et al.

(10) Patent No.: US 8,334,341 B2
(45) Date of Patent: Dec. 18, 2012

(54) CARBODIIMIDE COMPOUND AND USE THEREOF

(75) Inventors: Hideo Shibata, Osaka (JP); Koji Iwase, Osaka (JP); Hirohito Maeda, Osaka (JP); Takaaki Yodo, Osaka (JP)

(73) Assignee: Sakata INX Corp., Osaka (JP)

( * ) Notice: Subject to any disclaimer, the term of this patent is extended or adjusted under 35 U.S.C. 154(b) by 213 days.

(21) Appl. No.: 11/909,534

(22) PCT Filed: Mar. 23, 2006

(86) PCT No.: PCT/JP2006/305818
§ 371 (c)(1), (2), (4) Date: Sep. 9, 2008

(87) PCT Pub. No.: WO2006/101166
PCT Pub. Date: Sep. 28, 2006

(65) Prior Publication Data
US 2009/0036597 A1    Feb. 5, 2009

(30) Foreign Application Priority Data

Mar. 24, 2005    (JP) ................................. 2005-087164

(51) Int. Cl.
C08L 83/00    (2006.01)
C08L 83/04    (2006.01)
G03G 5/00    (2006.01)

(52) U.S. Cl. ........ 524/588; 106/493; 430/112; 430/113; 430/114; 430/115; 430/118.6; 430/137.22; 528/26; 528/45; 528/69

(58) Field of Classification Search .................. 524/588, 524/556, 599, 612, 609, 610, 495; 528/26, 528/422, 45, 65, 69, 75, 76, 77; 430/115, 430/112, 113, 114, 118.6, 137.22; 106/476, 106/493
See application file for complete search history.

(56) References Cited

U.S. PATENT DOCUMENTS

| | | | |
|---|---|---|---|
| 3,070,573 A | | 12/1962 | Beck |
| 4,214,066 A | * | 7/1980 | Moretto et al. ............... 528/28 |
| 5,773,546 A | * | 6/1998 | Tomlin et al. ............ 526/318.43 |
| 6,063,890 A | | 5/2000 | Tye |
| 6,225,370 B1 | * | 5/2001 | Suthar et al. ................ 523/160 |
| 6,656,979 B1 | * | 12/2003 | Kitano et al. ............... 522/100 |
| 7,252,710 B2 | * | 8/2007 | Kano et al. .................. 106/499 |
| 2003/0212198 A1 | | 11/2003 | Takao et al. |
| 2004/0265731 A1 | | 12/2004 | Okada et al. |
| 2005/0284335 A1 | | 12/2005 | Kano et al. |
| 2007/0203303 A1 | * | 8/2007 | Sogabe et al. ............... 525/324 |

FOREIGN PATENT DOCUMENTS

| | | |
|---|---|---|
| EP | 350 A | 6/1978 |
| EP | 0367219 A2 | 5/1990 |
| EP | 969030 A1 | 5/1999 |
| GB | 860327 | 2/1961 |
| JP | 6-25377 A | 2/1994 |
| JP | 10-007806 A | 1/1998 |
| JP | 10-7806 A | 1/1998 |
| JP | 2000-154226 A | 6/2000 |
| JP | 2001-207055 A | 7/2001 |
| JP | 2004-93706 A | 3/2004 |
| JP | 2005-23163 A | 1/2005 |
| JP | 2005-36220 A | 2/2005 |
| KR | 10-2005-0026932 A | 3/2005 |
| WO | WO 03/076527 A1 | 9/2003 |
| WO | WO 2004/000950 A1 | 12/2003 |
| WO | 2004/003085 A1 | 1/2004 |
| WO | WO 2004/003085 A1 | 1/2004 |

OTHER PUBLICATIONS

International Search Report of PCT/JP2006/305818, date of mailing May 23, 2006.
European Search Report issued Nov. 18, 2009 in corresponding European Patent Application 06745372.0.
Chinese Office Action dated Feb. 12, 2010, issued in corrersponding Chinese Patent Application No. 2006-80009623.
Australia Office Action dated Sep. 16 2010, issued in corresponding Australia Patent Application No. 2006225616.
Chinese Office Action dated Aug. 11, 2010, issued in corresponding Chinese Patent Application No. 200680009623.9.
Canadian Office Action dated Aug. 7, 2012, issued in corresponding Canadian Patent Application No. 2,602,712 (3 pages).

* cited by examiner

*Primary Examiner* — Bijan Ahvazi
(74) *Attorney, Agent, or Firm* — Westerman, Hattori, Daniels & Adrian, LLP

(57) ABSTRACT

An object of the present invention is to provide a carbodiimide type compound having high dispersibility and dispersion stability of pigments, fine resin particles, and pigment-resin composite fine particles particularly in a silicone dispersion medium; a pigment dispersion composition and a pigment-resin composite fine particles-containing dispersion composition preferably usable in a wide range of fields such as inks for solvent inkjet, liquid developers, and the like by using the compound; and a liquid developer using such a pigment dispersion composition and/or pigment-resin composite fine particles-containing dispersion composition. The present invention provides a carbodiimide type compound obtained by introducing a polysiloxane chain by reaction of a functional group of a polysiloxane chain-containing compound having the functional group reactive with a carbodiimide group with a carbodiimide group of a carbodiimide compound having a carbodiimide equivalent weight of 100 to 50000.

6 Claims, No Drawings

CARBODIIMIDE COMPOUND AND USE THEREOF

TECHNICAL FIELD

The present invention relates to a carbodiimide type compound and its use. More particularly, the present invention relates to a carbodiimide type compound efficacious in dispersion of pigments and particles containing pigments in silicone dispersion media and in dispersion of fine resin particles; a pigment dispersion composition and pigment-resin composite fine particles-containing dispersion composition, containing the above-mentioned compound, and usable in a wide range of fields as liquid developers, inks for solvent ink jet, and the like, as an intermediate composition; and a liquid developer as a final composition using such a pigment dispersion composition or pigment-resin composite fine particles-containing dispersion composition.

BACKGROUND ART

Since a carbodiimide compound is a rare compound having good reactivity with an acid group such as a carboxyl group, it has been used for crosslinking agents of the like of resins containing mainly acid groups. However, the carbodiimide compound has a characteristic of not only such crosslinking reactivity but also capability of easily introducing various kinds of functional side chains and therefore, in recent years, based on the characteristics, multi-functional polymer compounds have been designed and uses of the compound has been investigated in a variety of fields.

For example, from the viewpoint of application to a pigment dispersion technique, the present inventors promoted development of a method for giving high function of a carbodiimide compound and capability of finely dispersing a hardly dispersible pigment and stably keeping the dispersion state and already proposed the following:
(1) a method for using a carbodiimide group-containing compound as a method for utilizing a covalent bond with a functional group existing in the surface of a pigment (e.g., reference to Patent Document 1);
(2) a method for utilizing acid-base affinity Using a carbodiimide compound as a starting substance, as a method for utilizing the adsorption power of the surface of a pigment (e.g., reference to Patent Document 2); and
(3) a method for utilizing the affinity attributed to analogy of molecular structures (e.g., reference to Patent Document 3).

Such a pigment dispersant which the present inventors propose can deal with high concentration of a pigment and is highly excellent in the dispersion stability and fluidity even in the case of high concentration of a pigment and can give an excellent effect.

Further, the present inventors have found that it is possible to give another different effect to a carbodiimide compound additionally to the basic performance of the pigment dispersibility by introducing a different functional chain other than the above-mentioned functional chain to the carbodiimide compound and have applied for a patent.

This time, the present inventors have made investigations concerning introduction of a functional chain into a carbodiimide compound in order to improve the performance of a dispersant for the dispersion of a pigment, fine resin particles, pigment-resin composite fine particles (colored resin particles), or the like, particularly in a system using a silicone medium as a dispersion medium.

A silicone dispersion medium is used in various fields, in terms of harmless and odorless, high chemical and thermal stability, and a high insulation property and a dispersion medium of a liquid developer is one of the uses. However, so far, no proper material for dispersing a pigment or colored resin particles has been made available and even among the techniques developed and disclosed recently, they are still not efficient.

For example, a technique of treating a pigment-containing toner particles with a silane coupling agent and giving dispersibility is disclosed (e.g., reference to Patent Document 4), however the method is insufficient to cause an efficient effect attributed to a low molecular weight of a silane coupling agent to be used for the treatment.

Further, as a dispersant for dispersing a pigment and a pigment-containing colored resin particles, for example, a technique of using a silicone graft polymer obtained by reaction of a monomer composing a main chain part insoluble in a silicone dispersion medium and a monomer composing a graft parts soluble in a silicone dispersion medium containing a silicone macromer having a polymerizable functional group at the terminal (e.g., reference to Patent Document 5). However, in recent years, in order to obtain higher quality of images, those in which a pigment and colored resin particles are every finely dispersed are required. Since the capability of the above-mentioned dispersants are insufficient, it is required to develop a dispersant having further higher dispersibility.

Patent Document 1: International publication No. 03/076527 pamphlet
Patent Document 2: International publication No. 04/000950 pamphlet
Patent Document 3: International publication No. 04/003085 pamphlet
Patent Document 4: Japanese Kokai Publication No. 2004-093706
Patent Document 5: Japanese Kokai Publication No. 2005-036220

SUMMARY OF THE INVENTION

Therefore, an object of the present invention is to provide a carbodiimide type compound having high dispersibility and dispersion stability of pigments, fine resin particles, and pigment-resin composite fine particles particularly in a silicone dispersion medium; a pigment dispersion composition and a pigment-resin composite fine particles-containing dispersion composition preferably usable in a wide range of fields such as inks for solvent ink jet, liquid developers, and the like by using the compound; and a liquid developer using such a pigment dispersion composition and/or pigment-resin composite fine particles-containing dispersion composition.

The present inventors have made investigations to solve the above-mentioned problems and have found that use of a carbodiimide type compound having a polysiloxane side chain makes it possible to solve all of the above-mentioned problems. These findings have let to completion of the present invention.

That is, the present invention provides (1) a carbodiimide type compound obtained by introducing a polysiloxane chain by reaction of a functional group of a polysiloxane chain-containing compound having the functional group reactive with a carbodiimide group with a carbodiimide group of a carbodiimide compound having a carbodiimide equivalent weight of 100 to 50000.

Further, the present invention provides (2) the carbodiimide type compound as described in (1) having a carbodiimide group in the molecule.

The present invention also provides (3) the carbodiimide type compound as described in (1) or (2) further having at least one kind of chains selected from the group consisting of basic nitrogen-containing chains, pigment derivative chains, pigment intermediate chains, coloring material derivative chains, and coloring material intermediate chains.

Further, the present invention also provides (4) the carbodiimide type compound as described in any one of (1) to (3) in which a polysiloxane chain-containing polymer having an acid group in one terminal of the molecule and obtained by polymerization of a no acid group-containing radical polymerizable compound which contains at least one kind of no acid group-containing polysiloxanes having radical polymerizable unsaturated bonds at the terminals in the presence of an acid group-containing chain transfer agent, as the above-mentioned polysiloxane chain-containing compound.

Further, the present invention also provides (5) the carbodiimide type compound as described in any one of (1) to (4) using a thiol acid group-containing chain transfer agent as the above-mentioned acid group-containing chain transfer agent.

Further, the present invention also provides (6) a pigment dispersion composition containing the carbodiimide type compound as described in any one of (1) to (5).

Further, the present invention also provides (7) a pigment-resin composite fine particles-containing dispersion composition containing the carbodiimide type compound as described in one of (1) to (5).

Further, the present invention also provides (8) a liquid developer containing the pigment dispersion composition as described in (6) and/or the pigment-resin composite fine particles-containing dispersion composition as described in (7).

DETAILED DESCRIPTION OF THE INVENTION

<With Respect to Carbodiimide Type Compound>

A carbodiimide type compound of the present invention is obtained by introducing a polysiloxane chain as a side chain into a carbodiimide group of a carbodiimide compound having a carbodiimide equivalent weight of 100 to 50000 by using a polysiloxane chain-containing compound having a functional group reactive with the carbodiimide group. As its basic performance, the carbodiimide type compound can be used preferably for a variety of applications where the dispersion stability of pigments and fine resin particles is required and since it can give good dispersibility in systems using a silicone dispersion medium as a dispersion medium, the carbodiimide type compound can be used preferably also for the applications for a liquid developer, an ink composition for solvent ink jet, and the like using such a dispersion medium.

Herein, the term "side chain" means a chain branched from a portion derived from a carbodiimide compound and formed by reaction of the carbodiimide group of the carbodiimide compound with a compound having a group reactive with the carbodiimide group. Hereinafter, in the present invention, regardless of the size of a chain structure, the portion derived from the carbodiimide compound is called as a "main chain" and the chains branched from the main chain are all called "side chains".

The carbodiimide type compound of the present invention may have carbodiimide groups all reacted with the functional group of a polysiloxane chain-containing compound or all reacted with the functional group of a polysiloxane chain-containing compound and other functional groups to be used for introducing the functional chains as described below, or may have an unreacted carbodiimide group.

1) Materials for Synthesizing Carbodiimide Type Compound

At first, as indispensable constituent materials for the carbodiimide type compound of the present invention, a carbodiimide compound, which is a starting substance, and a polysiloxane chain-containing compound for introducing the polysiloxane chain will be described.

1-1) Carbodiimide Compound

A carbodiimide compound to be used as a starting substance in order to obtain a carbodiimide type compound of the present invention may be a compound having at least one carbodiimide group, that is, a group defined by the formula: —N=C=N— in the molecular, and herein, the compound will be described more in detail while exemplifying the following preferable configurations (a) to (d). Carbodiimide compounds may be used while being properly selected in accordance with the use state of carbodiimide type compounds to be obtained.

(a) Carbodiimide Compound Obtained by Decarboxylation Reaction of a Diisocyanate Compound and having an Isocyanate Group A carbodiimide compound can be generally produced by carbodiimidizing an isocyanate compound by decarboxylation reaction in the presence of a carbodiimidation catalyst in an organic solvent. Further, in the case where the material is a diisocyanate compound, a carbodiimide compound having isocyanate groups at both terminals of the molecule can be obtained.

In the above-mentioned production method, examples of the diisocyanate compound to be decarboxylated may include, for example, aliphatic, alicyclic, aromatic, or aromatic/aliphatic diisocyanates such as hexamethylene diisocyanate, isophorone diisocyanate, tolylene diisocyanate, diphenylmethane diisocyanate, cyclohexane diisocyanate, dicyclohexylmethane diisocyanate, xylylene diisocyanate, tetramethylene diisocyanate, and tetramethyl xylylene diisocyanate.

As the above-mentioned organic solvent may be preferably employed those which have a high boiling point and no active hydrogen to be reacted with the isocyanate compound, and the compound having the carbodiimide group to be produced and examples thereof may include aromatic hydrocarbons such as toluene, xylene, and diethylbenzene; glycol ether esters such as diethylene glycol diacetate, dipropylene glycol dibutylate, hexylene glycol diacetate, glycol diacetate, methyl glycol acetate, ethyl glycol acetate, butyl glycol acetate, ethyl diglycol acetate, and butyl diglycol acetate; ketones such as ethyl butyl ketone, acetophenone, propiophenone, diisobutyl ketone, and cyclohexanone; and aliphatic esters such as amyl acetate, propyl propionate, and ethyl butyrate.

As the above-mentioned carbodiimidation catalyst, it is preferable to use phosphorenes, phosphorene oxides, and the like and examples thereof may include
1-ethyl-3-methyl-3-phosphorene oxide,
1-phenyl-3-methyl-3-phosphorene oxide, and
1-phenyl-3-methyl-2-phosphorene oxide.

A method for carrying out the decarboxylation reaction of the isocyanate group using these materials, a conventionally known method may be used, for example, be carried out at a reaction temperature of 100 to 200° C. in nitrogen atmosphere. Other methods for obtaining the above-mentioned carbodiimide group-containing compound may include methods disclosed in U.S. Pat. No. 2,941,956, Japanese Kokoku Publication No. Sho-47-33279, and Japanese Kokai Publications No. Hei-5-178954 and Hei-6-56950.

With respect to the isocyanate group-containing carbodiimide compound obtained in such a production method, for example, a compound obtained by decarboxylation of k mole (k is an integer of 2 or higher) of a diisocyanate compound is defined by the following formula (1).

OCN-(A-N=C=N)$_{(k-1)}$-A-NCO     (1)

In the above formula (1), A denotes residual groups except for an isocyanate group of a diisocyanate compound which is used for synthesizing an isocyanate group-containing carbodiimide compound.

Commercialized products of the isocyanate group-containing carbodiimide defined by the above formula (1) are Carbodilite V-03, V-05 (both are trade names, manufactured by Nisshinbo Industries, Inc.) as carbodiimides using tetramethylxylylene diisocyanate of a material.

(b) Carbodiimide Compound Obtained by Further Extending the Chain of the Above-Mentioned Carbodiimide Compound (a) by a Chain Extender The above-mentioned carbodiimide compound is obtained by increasing the molecular weight of the carbodiimide compound (a) using a chain extender reactive with the isocyanate group and therefore have more carbodiimide groups in the molecule. The chain extender to be used in this case is preferably a compound having low reactivity with the carbodiimide group and selectively reactive with the isocyanate group with a higher priority and examples thereof may include diol compounds such as polyester polyols, polybutadiene diol and polysiloxanediol; diamine compounds such as hexamethylene diisocyanate, isophorone diisocyanate, and tolylene diisocyanate; and hydrazines.

(c) Compound Obtained by Decarboxylation of 2 Moles of a Monoisocyanate Compound and k Mole (k is an Integer of 1 or Higher) of a Diisocyanate Compound The above-mentioned carbodiimide compounds (a) and (b) are compounds having isocyanate groups at both terminals of the molecules and accordingly have an advantageous point that the isocyanate group can be utilized to add various molecular chains and instead, also have a problem that if a material to be reacted with the carbodiimide group is also reactive with the isocyanate group, it becomes difficult to introduce it as a side chain. On the other hand, in the case of the carbodiimide compound having both terminals of the molecule terminated with a monoisocyanate compound for non-reactivity, the carbodiimide compound is free from the above-mentioned problem. Such a carbodiimide compound having both terminals of the molecule terminated with a monoisocyanate compound for non-reactivity can be defined by the following formula (2).

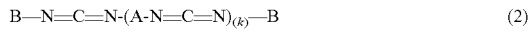

B—N=C=N-(A-N=C=N)$_{(k)}$—B     (2)

In the above formula (2), B denotes the residual groups except for an isocyanate group of a monoisocyanate compound which is used for synthesizing an isocyanate group-containing carbodiimide compound.

Herein, a usable diisocyanate compound may include those exemplified as the synthesis material in the above-mentioned compound (a) and examples of a monoisocyanate compound may include aliphatic, alicyclic, aromatic, and aromatic/aliphatic monoisocyanate compounds such as methyl isocyanate, ethyl isocyanate, propyl isocyanate, butyl isocyanate, octadecyl isocyanate, and phenyl isocyanate.

(d) Compound Obtained by Decarboxylation of 1 Mole of a Monoisocyanate Compound and k Mole (k is an Integer of 1 or Higher) of a Diisocyanate Compound.

As an intermediate compound between a compound having isocyanate groups at both terminals of the molecule and a compound having no isocyanate group, a carbodiimide compound in which only one terminal is made non-reactive by a monoisocyanate compound and the other terminal has an isocyanate group can be obtained. Such a carbodiimide compound made non-reactively with a monoisocyanate compound at one terminal can be defined by the following formula (3).

OCN-(A-N=C=N)$_{(k)}$—B     (3)

In the above-mentioned formula (3), B denotes the residual groups except for an isocyanate group of a monoisocyanate compound which is used for synthesizing an isocyanate group-containing carbodiimide compound.

Herein, a usable diisocyanate compound may include those exemplified as the synthesis material in the above-mentioned compound (a), and examples of a monoisocyanate compound may include those exemplified as the synthesis material in the above-mentioned compound (c).

The carbodiimide compounds (a) to (d) may be used alone or two or more of them may be used in combination as a starting substance of synthesis of a carbodiimide type compound.

With respect to the above-mentioned carbodiimide compound, those having a carbodiimide equivalent weight of 100 to 50000 are used. Herein, the carbodiimido equivalent weight means the number defined as (the molecular weight of the carbodiimide compound)/(the number of carbodiimide groups in the carbodiimide compound molecular). If the carbodiimido equivalent weight of the compound is too high, the ratio by weight of polysiloxane chain-containing side chains to the entire molecule of the carbodiimide type compound to be obtained becomes low and accordingly, the dispersibility of pigments and fine resin particles is lowered. On the other hand, in the case of a carbodiimide compound with a low carbodiimido equivalent weight, the compound is advantageous in a point that the ratio by weight of polysiloxane chain-containing side chains and the ratio by weight of side chains having various functions as will be described below, to the entire molecule of the carbodiimide type compound, can be made relatively high, however the synthesis of the carbodiimide compound itself and the control of the reaction for introducing the side chains becomes difficult. Accordingly, the carbodiimido equivalent weight is more preferably 200 or higher and 10000 or lower.

1-2) Polysiloxane Chain-Containing Compound for Introducing Polysiloxane Chain

Next, a compound to be used for introducing polysiloxane chain into the above-mentioned carbodiimide compound will be described.

To produce the carbodiimide type compound of the present invention, a method for introducing a side chain by reaction of carbodiimide group and a functional group reactive with the carbodiimide group is employed. Accordingly, as a compound to be introduced as a side chain, polysiloxane chain-containing compound having a functional group reactive with the carbodiimide group can be used.

Further, the functional group reactive with the carbodiimide group may include a carboxyl group, a sulfonic acid group, a phosphoric acid group, a hydroxyl group, and an amino group and acid groups such as a carboxyl group, a sulfonic acid group, and a phosphoric acid group are preferable.

As the polysiloxane chain-containing compound having such a functional group are used the following materials.

(1) Compound Obtained by Reaction of Polysiloxane Polyol with Acid Anhydride

Practical examples thereof include compounds obtained by reaction of polysiloxane polyols with acid anhydrides such as phthalic anhydride, maleic anhydride, succinic anhydride, benzoic anhydride, and styrene-maleic anhydride resin.

(2) Polysiloxane Chain-Containing Polymer having an Acid Group at One Terminal

As a polysiloxane chain-containing compound having the functional group reactive with the carbodiimide group are employed polysiloxane chain-containing polymers having acid groups at one terminals and obtained by polymerization of no acid group-containing radical polymerizable compounds which contain at least one kind of no acid group-containing polysiloxanes having radical polymerizable unsaturated bonds at the terminals in the presence of an acid group-containing chain transfer agent.

Examples of the above-mentioned acid group-containing chain transfer agent may include thiol chain transfer agents having mercapto group such as mercaptoacetic acid, 2-mercaptopropionic acid, 3-mercaptopropionic acid, and mercaptobenzoic acid; sulfonic acid group-containing chain transfer agents such as 2-chloroethanesulfonic acid, sodium 2-chloroethanesulfonate, 4-chlorophenylsulfoxide, 4-chlorobenzenesulfonamide, p-chlorobenzenesulfonic acid, sodium p-chlorobenzenesulfonate, sodium 2-bromoethanesulfonate, and sodium 4-(bromomethyl)benzenesulfonate. Among the above-mentioned acid group-containing chain transfer agents, thiol acid group-containing chain transfer agents are preferable and mercaptoacetic acid, 2-mercaptopropionic acid, 3-mercaptopropionic acid, and mercaptobenzoic acid are more preferable.

Further, examples of the no acid group-containing polysiloxane having radical polymerizable unsaturated bonds at the terminals may include no acid group-containing polydimethylsiloxane monomers having methacryloyl at the terminals, and silicone macromonomer.

Further, based on the necessity, within the extent that the property is not deteriorated, a no acid group-containing radical polymerizable unsaturated monomer may be used in combination. Practical examples thereof include (meth) acrylate compounds such as alkyl (meth) acrylate monomers (e.g., methyl methacrylate) and aromatic ring-containing (meth) acrylate monomers (e.g., aryl acrylate, aryl methacrylate, benzyl acrylate, and benzyl methacrylate); and styrene monomers such as styrene and α-methylstyrene.

At the time of synthesis of the polysiloxane chain-containing polymer having an acid group at one terminal using such components, as an initiator which is commonly employed, azo-nitrile compounds such as 2,2'-azobis-isobutyronitrile, 1,1'-azobis-1-cyclobutanenitrile, and 2,2'-azobis-2-methyl-butyronitrile; azo compounds such as 2,3-diaza-bicyclo[2,2,]heptene, 2,2,2'-azobis-propane, 1,1'-azobis-1-phenylethane; peroxide compounds such as tert-butyl peroxide, benzoyl peroxide, tert-butyl hydroperoxide, and cumene hydroperoxide may be used.

The above-mentioned polysiloxane chain-containing polymer having an acid group at one terminal is synthesized from a material having no acid group reactive with the carbodiimide group except for the acid group-containing chain transfer agent and the functional group reactive with the carbodiimide group is solely the acid group at one terminal of the molecule.

The polysiloxane chain-containing polymer having an acid group at one terminal of the above-mentioned molecule may be synthesized by a polymerization method such as bulk polymerization, solution polymerization, or if necessary suspension polymerization in a collectively loading manner, an initiator dropwise addition manner, or a monomer dropwise addition manner at a reaction temperature equal to or higher than the decomposition temperature of the initiator, generally at 70 to 170° C. for 1 to 8 hours. In this polymerization, use of the acid group-containing chain transfer agent as the chain transfer agent makes it possible to obtain the polysiloxane chain-containing polymer having an acid group at one terminal.

The polysiloxane chain to be introduced as the side chain is not particularly limited if the carbodiimide type compound to be obtained has a function of improving the dispersion stability of pigments, fine resin particles, pigment-resin composite fine particles in a dispersion medium, however it is preferable for the polysiloxane chain to have a number average molecular weight of 200 or higher and 15000 or lower. It is more preferably 300 or higher and 12000 or lower.

In the synthesis of the polysiloxane chain-containing polymer having an acid group at one terminal, the addition amount of the acid group-containing chain transfer agent is properly determined in accordance with the type and addition amount of the monomer to be used and the type of the acid group-containing chain transfer agent so as to give the aimed number average molecular weight.

The above-mentioned polysiloxane chain-containing compound is preferably the polysiloxane chain-containing polymer having an acid group at one terminal of the molecule.

1-3) Material for Introducing Other Functional Chains

In accordance with the required performances, the above-mentioned carbodiimide type compound have one or more kinds of molecular chains and functional groups (A) to (D) as described below having various kinds of functionalities in the molecule, so that a compound having a plurality of functions can be obtained. In terms that the carbodiimide type compound having a plurality of these functions may possibly be used in a wider range of fields, it is a preferable embodiment of the present invention.

(A) carbodiimide group,
(B) basic nitrogen-containing chain,
(C) at least one kind chain selected from the group consisting of pigment derivative chains, pigment intermediate chains, coloring material derivative chains, and coloring material intermediate chains, and
(D) at least one kind chain selected from the group consisting of polyester chains, polyether chains, and polyacryl chains.

Herein, to introduce the carbodiimide group (A), in the production of the carbodiimide type compound, at the time of introducing the above-mentioned polysiloxane chain, a carbodiimide compound having at least two or more carbodiimide groups in the molecules can be used while at least one carbodiimide group in the compound being un-reacted and left as it is. For the introduction of the functional chain described in (B), materials described in International publication No. 04/000950 pamphlet can be used; for the introduction of the functional chain described in (C), materials described in International publication No. 04/003085 pamphlet can be used; and for the introduction of the functional chain described in (D), materials described in International publication No. 03/076527 pamphlet can be used.

2) With Respect to Molecular Structure and Effect of Carbodiimide Type Compound

The carbodiimide type compound is obtained by using the above-mentioned materials. Therefore, a method of introducing the above-mentioned polysiloxane chain-containing compound into the carbodiimide compound, which is a starting compound, by reaction with the carbodiimide group can be used.

In the case of using a compound having a structure defined by the above-mentioned formula (1) for the carbodiimide compound, which is a starting compound, such a carbodiimide type compound can be typically defined by the following formula (4):

$$OCN—X_{(1)}—(N=C=N)_{(n-1)}—OCN \quad (4)$$

wherein X independently denotes a constituent unit containing a polysiloxane chain bonded through a linking group formed by reaction of a carbodiimide group with a functional group reactive therewith; 1 denotes the number of the constituent units X in one molecule and an integer of one or higher; n denotes the number of carbodiimide groups in the carbodiimide compound as a starting substance and an integer of one or higher; and (n-1) denotes an integer of 0 or higher.

With respect to the materials for introducing chains (B) to (D) having other functions and used arbitrarily, a method for the introduction by reaction with either the carbodiimide group or the isocyanate group can be used. Examples of such a carbodiimide type compound can be typically defined by the following formula (5) in the case of using a compound having the structure defined by the above-mentioned formula (1) as the carbodiimide compound, which is a starting compound.

$$Y—X_{(1)}-Z_{(m)}-(N=C=N)_{(n-1-m)}—Y \quad (5)$$

wherein X, n and 1 can be respectively defined as described above; Y independently denotes a non-reacted isocyanate group or a constitutional unit containing the above-mentioned functional chains (B) to (D) bonded through a linking group formed by reaction of an isocyanate group with a functional group reactive therewith; Z independently denotes a constitutional unit containing the above-mentioned functional chains (B) to (D) bonded through a linking group formed by reaction of a carbodiimide group and a functional group reactive therewith; m denotes the number of the constituent units Z in the molecule and is an integer of 0 or higher; and (n-1-m) also denotes an integer of 0 or higher.

The above-mentioned formulas (4) and (5) symbolically show only main portions and although the structures formed by respectively continuing the constituent units of X and Z are typically defined, structures in which X, Z, and —(N=C=N)— are bonded randomly are also included. The formula (4) shows the basic configuration of the carbodiimide type compound of the present invention and on the other hand, the formula (5) shows a preferable configuration for multi-functionalization.

Further, the portion defined by Y in the above-mentioned formula (5) is other than (B) to (D) and may be a constituent unit bonded through a linking group by similar reaction of a compound possible to be reacted with the isocyanate group. The compound having a functional group reactive with the isocyanate group is preferably those which have low reactivity with the carbodiimide group but is selectively reactive with the isocyanate group in higher priority and examples thereof include hydroxyl-containing compounds such as methanol, ethanol, polybutadiene diol, and polysiloxane diol; secondary amine compounds such as diethylamine and dibutylamine.

The linking group formed at the time of introducing the above-mentioned side chain by reaction of the functional group reactive with the carbodiimide group is generally formed by reaction of the carbodiimide group with a carboxyl group, a sulfonic acid group, a phosphoric acid group, a hydroxyl group, an amino group, and the like and has the following structure.

For example, the linking group formed by reaction of the carbodiimide group and a carboxyl group is defined by the following formulas (6) and (7); the linking group formed by reaction of the carbodiimide group and a hydroxyl group is defined by the following formulas (8) and (9); the linking group formed by reaction of the carbodiimide group and an amino group is defined by the following formula (10); the linking group formed by reaction of the carbodiimide group and a sulfonic acid group is defined by the following formula (11); and the linking group formed by reaction of the carbodiimide group and a phosphoric acid group is defined by the following formula (12).

Further, the linking group formed by reaction of the functional group reactive with an isocyanate group is generally formed by reaction of the isocyanate group with a hydroxyl group, primary and secondary amino groups and has the following structure.

For example, the linking group formed by reaction of the isocyanate group and a hydroxyl group is defined by the following formula (13) and the linking group formed by reaction of the isocyanate group and an amino group is defined by the following formula (14).

$$\begin{array}{c} —NH—C=N— \\ | \\ O—CO— \end{array} \quad (6)$$

$$\begin{array}{c} —NH—CO—N— \\ | \\ CO— \end{array} \quad (7)$$

$$\begin{array}{c} —NH—CO—N— \\ | \end{array} \quad (8)$$

$$\begin{array}{c} —NH—C=N— \\ | \\ O— \end{array} \quad (9)$$

$$\begin{array}{c} —NR—C—NR— \\ \| \\ N— \end{array} \quad (10)$$

$$\begin{array}{c} —NH—C=N— \\ | \\ O—SO_2— \end{array} \quad (11)$$

$$\begin{array}{c} —NH—C=N— \\ | \\ O—PO_3— \end{array} \quad (12)$$

$$—O—CO—NH— \quad (13)$$

$$—NR—CO—NH— \quad (14)$$

In the above-mentioned formulas, R denotes a hydrogen atom or a hydrocarbon group with 1 or more carbon atoms.

As described above, the carbodiimide type compound of the present invention is a compound having a constituent unit denoted as X in the formula (4) and formed by introducing at least one polysiloxane chain through at least one linking group defined by any one of the formulas (6) to (12) into the carbodiimide group portion of the carbodiimide compound defined by the formula (1), which is a starting substance. Further, the carbodiimide type compound of the present invention is a compound having a constituent unit denoted as Z in the formula (5) and formed by introducing a functional side chain similarly, and a compound formed by introducing a functional chain through a linking group defined by the formula (13) or (14) into both terminals or one terminal of the molecular. In particular, compounds having the carbodiimide group remaining in the molecule are preferable.

Since the carbodiimide type compound of the present invention is obtained by introducing the polysiloxane chain by reaction of the carbodiimide group of a carbodiimide compound with a functional group of a polysiloxane chain-containing compound having the functional group reactive with the carbodiimide group, the affinity of the carbodiimide type compound with a silicone dispersion medium in a form of a compound is improved and the carbodiimide type compound forms domains in the dispersion medium to cause steric hindrance and accordingly is capable of improving the dispersibility of pigments, pigment-resin composite fine particles, fine resin particles, and the like without deteriorating other properties during the use of the silicone dispersion medium.

Further, the carbodiimide type compound of the present invention is made to be multi-functional by introducing other functional side chains and for example, with respect to the pigment dispersion function, which is a basic performance, further sufficient effects can be exhibited by introducing functional groups and side chains having dispersion stabilization functions by a covalent bond or adsorption with the pigment surface in accordance with the type of the pigment to be used. That is, in the case of using a pigment, which will be described later, having a functional group reactive with the carbodiimide group on the surface, the carbodiimide type compound is made to have one of more carbodiimide groups and the functional groups are made to have a covalent bond, so that further efficient pigment dispersibility can be caused. Further, in the case of using a pigment having an acid portion in the surface, if the carbodiimide type compound is made to have a basic nitrogen-containing chain in the molecule, the adsorption attributed to the acid-base affinity can be utilized. The above-mentioned term "basic nitrogen-containing chain" means at least one basic nitrogen-containing group and the term "basic nitrogen-containing group" includes groups containing nitrogen, which form quaternary ammonium ion in water as well as groups containing nitrogen acting as a Lewis base and typical examples thereof include amino groups and nitrogen-containing heterocyclic rings. Further, in the case of using the adsorption attributed to the affinity owing to the analogy of the pigment molecular structure, the carbodiimide type compound is made to have a pigment derivative chain, a pigment intermediate chain, a coloring material derivative chain, and/or a coloring material intermediate chain in the molecule.

From the viewpoint of stabilization of the dispersion of a pigment in a dispersion medium, the carbodiimide type compound may have at least one kind of chains selected from the group consisting of polyester chains and polyacryl chains.

On the other hand, in the application field of using no silicone dispersion medium as a dispersion medium, from the viewpoint of stabilization of the dispersion of a pigment in the dispersion medium, the above-mentioned carbodiimide type compound is preferable to have at least one kind of chains, especially more preferably side chains, selected from the group consisting of polyester chains, polyether chains, and polyacryl chains. Since these side chains form domains in a dispersion medium and cause steric hindrance in the case of dispersion of a pigment in the dispersion medium, it is supposed to be possible that the pigment can be stably dispersed in the dispersion medium.

3) Production Method of Carbodiimide Type Compound

In the case of producing the carbodiimide type compound of the present invention using the above-mentioned material, all of the reactions, that is, reactions of introducing the polysiloxane chain as a side chain and introducing other functional chains by reaction of a carbodiimide group with a carboxyl group, a sulfonic acid group, a phosphoric acid group, a hydroxyl group, an amino group, or the like as well as reaction of an isocyanate group with a hydroxyl group, an amino group, or the like can be carried out using common methods. Further, the order for introducing various kinds of the functional chains is not particularly limited and in the case of using two or more kinds of compounds having functional groups reactive with the carbodiimide group, the compounds may be added separately or simultaneously to cause the reaction. Further, in the case of using a compound having a functional group reactive with the carbodiimide group and a compound having a functional group reactive with the isocyanate group, if the same compounds are obtained finally, either reaction of the carbodiimide group or reaction of the isocyanate group may be carried out prior.

The side chains having the polysiloxane chains to be introduced in the molecules, the types and the ratios of various kinds of functional chains, and also the number of remaining carbodiimide groups may be properly set in accordance with the types of the pigments and dispersion media to be used in form of a pigment dispersant and the capabilities required in other application fields and it is preferable to add the respective materials to finally give a compound having good functional balance.

The number average molecular weight of the carbodiimide type compound of the present invention obtained using the above-mentioned materials by the above-mentioned production method is preferably 1000 or higher and 100000 or lower. If the number average molecular weight becomes too high, it becomes difficult to obtain a proper viscosity in the case of obtaining a pigment dispersion composition, a pigment-resin composite fine particles-containing dispersion composition, or a fine particle dispersion composition by dispersing pigments, pigment-resin composite fine particles, or fine resin particles in a dispersion medium and especially, it is not preferable when it is required to obtain a pigment dispersion composition with a high pigment concentration or a pigment-resin composite fine particles-containing dispersion composition with a high concentration of the pigment-resin composite fine particles. On the other hand, if the number average molecular weight is too low, the dispersion stability of the pigments and pigment-resin composite fine particles in the dispersion medium is undesirably lowered.

<Pigment Dispersion Composition>

Next, a pigment dispersion composition obtained by finely dispersing a pigment using the above-mentioned carbodiimide type compound will be described.

In the pigment dispersion composition of the present invention, the carbodiimide type compound to be used as a dispersant may be properly selected preferably from carbodiimide type compounds having the above-mentioned functional groups and functional chains (A) to (D) in accordance with the functional group (e.g., a carboxyl group, a sulfonic acid group, a phosphoric acid group, and a hydroxyl group) of the pigment surface, existence of adsorption points (acid portion and basic portion), the type of the dispersion medium, and application of the obtained pigment dispersion composition.

In the pigment dispersion composition of the present invention, the pigment is preferable to be adsorbed due to at least a covalent bond, acid-base affinity, or affinity attributed to the analogy of molecular structure with the carbodiimide type compound and may include organic pigments and inorganic pigments to be used commonly, for example, for a liquid developer, an ink compound for solvent ink jet, and the like.

At first, the pigment having a covalent bond with the carbodiimide group-containing carbodiimide type compound is preferably those having a functional group reactive with the carbodiimide group on the surface and especially preferably organic pigments and inorganic pigments having at least one functional group selected from the group consisting of a carboxyl group, a sulfonic acid group, a phosphoric acid group, a hydroxyl group, and an amino group.

Examples of the above-mentioned organic pigments are dye lake pigments, azo pigments, benzimidazolone pigments, phthalocyanine pigments, quinacridone pigments, anthraquinone pigments, dioxazine pigments, indigo pigments, thoiindigo pigments, perylene pigments, perinone pigments, diketopyrrolopyrrole pigments, isoindolinone pigments, nitro pigments, nitroso pigments, anthraquinone pigments, flavanthrone pigments, quinophthanone pigments, pyranthrone pigments, and indathrone pigments. Examples of the inorganic pigments are carbon black (preferably having carboxyl at pH 7 or lower), titanium oxide, red iron oxide, graphite, black iron oxide, chromium oxide (chrom green), and aluminum oxide.

In the case of a pigment having no functional group reactive with the carbodiimide group on the surface, the functional group may be introduced by surface treatment, and for example, the above-mentioned functional group reactive with the carbodiimide group may be introduced by plasma treatment and oxygen/ultraviolet treatment described in, for example, "Techniques and evaluations of pigment dispersion stability and surface treatment", 1st edition, Technical information institute Co., Ltd(publisher), Dec. 25, 2001, p.76-85; and a low temperature plasma method described in Japanese Kokai Publication No. Sho-58-217559. Further, the pigment may be coated with an insulating compound (e.g., silica, silane compound, titanium compound, and the like) to introduce the functional group reactive with the carbodiimide group.

Next, the pigment having an adsorption part attributed to the acid-base affinity to the carbodiimide type compound having a basic nitrogen-containing chain may include preferably organic pigments and inorganic pigments having an adsorption part of a basic nitrogen-containing group on the surface.

The adsorption part of a basic nitrogen-containing group is typically an acid group and preferably a functional group capable of adsorbing the basic nitrogen-containing group such as a carboxyl group, a sulfonic acid group, and a phosphoric acid group.

Examples of the organic pigment having a adsorption part of the basic nitrogen-containing group are dye lake pigments, azo pigments, benzimidazolone pigments, phthalocyanine pigments, quinacridone pigments, anthraquinone pigments, dioxazine pigments, indigo pigments, thoiindigo pigments, perylene pigments, perinone pigments, diketopyrrolopyrrole pigments, isoindolinone pigments, nitro pigments, nitroso pigments, anthraquinone pigments, flavanthrone pigments, quinophthanone pigments, pyranthrone pigments, and indathrone pigments. The inorganic pigments may include carbon black (preferably having carboxyl at pH 7 or lower).

Even pigments which do not have the adsorption part of the basic nitrogen-containing group may have carboxyl or sulfonic acid group by induction treatment and sulfonation treatment for the pigment surface and treatment in a common functional group introduction method.

Next, the pigment having an adsorption part attributed to the affinity due to the analogy of molecular structure to the carbodiimide type compound having a pigment derivative chain, a pigment intermediate chain, a coloring material derivative chain, and a coloring material intermediate chain in the molecule may preferably include organic pigments and inorganic pigments having same or analogous structures of pigment derivative, a pigment intermediate, a coloring material derivative, and a coloring material intermediate; and organic pigments and inorganic pigments which have no same or analogous structures of pigment derivative, a pigment intermediate, a coloring material derivative, and a coloring material intermediate but having sufficient adsorbing property to the pigment derivative, a pigment intermediate, a coloring material derivative, and a coloring material intermediate.

The adsorption attributed to the affinity due to such analogy of the molecular structure is made more sufficient in the case of, for example, pigments having no functional group reactive with the carbodiimide group and/or isocyanate group (in the case where no covalent bond is usable); and pigments even having a functional group reactive with the carbodiimide group in the case where the functional group reactive with the carbodiimide group is an amino group or a hydroxyl group and the temperature for the reaction with the carbodiimide group is 100° C. or high (in the case of the use of the covalent bond is difficult in terms of conditions).

Preferable combinations of the pigment derivative, the pigment intermediate, the coloring material derivative, and/or a coloring material intermediate with the pigment are, for example, (1) with respect to a phthalocyanine pigment derivative as a pigment derivative, combinations with pigment black 7 as well as the phthalocyanine pigments as the pigment; (2) with respect to a β-naphthol orange dye derivative as a coloring material derivative, combinations with condensed azo pigments as well as the naphthol pigments as the pigment; and (3) with respect to an anthraquinone derivative as a coloring intermediate, combinations with diketopyrolopyrrol pigments, condensed azo pigments, isoindolinone pigments, perinone pigments, hetero ring-having azo pigments, quinacrylidone pigments, dibromoanthanthrone pigments and/or benzimidazolone pigments as well as the dianthraquinonyl pigments as the pigment.

A method for obtaining the pigment dispersion composition using the above-mentioned carbodiimide type compound may be (I) a method for obtaining a pigment composition by treating a pigment only with the carbodiimide type compound and successively adding and stirring a dispersion medium capable of stably dispersing the pigment and various kinds of binder resins, photopolymerizable compounds, solvents, surfactants, and other additives based on the necessity; and (II) a method for obtaining a pigment composition by dispersing and treating a pigment in a dispersion medium, in which the carbodiimide type compound has been dissolved, and the pigment is capable of stably being dispersed in the dispersion medium. In the method (II), at the time of dispersing the pigment or after dispersing the pigment, various kinds of binder resins, photopolymerizable compounds, solvents, surfactants, and other additives may be added based on the necessity.

"Treatment" in this invention means treatment of the entire face or a portion of the pigment dispersion particle surface with the carbodiimide type compound. Practically, it means a dispersion treatment method for kneading a mixture of the above-mentioned pigment and the above-mentioned carbodiimide type compound and if necessary a dispersion medium and other additives by a roll mill, a kneader, a high speed stirring apparatus, a bead mill, a ball mill, a sand mill, an ultrasonic dispersing apparatus, a high pressure dispersing apparatus, or the like.

The above-mentioned method (I) for obtaining the pigment dispersion composition may be a method of treating the pigment at a temperature equal to or higher than the melting point of the carbodiimide type compound and successively dispersing the pigment in a dispersion medium preferable for arbitrary uses. In the case of treating the pigment having a functional group reactive with the carbodiimide group, it is preferable to carry out heating at a temperature for promoting the reaction between the functional groups, that is, around 100° C. or lower and preferably at 40 to 80° C.

On the other hand, in the method (II) for obtaining the pigment dispersion composition, it is possible to carry out the treatment at a relatively low temperature, however in the case of treating a pigment having a functional group reactive with the carbodiimide group with a carbodiimide type compound having the carbodiimide group in the molecule, it is preferable to increase the temperature sufficient to promote the above-mentioned reaction.

Further, the dispersion medium to be used for the above pigment dispersion composition is preferably a silicone dispersion medium. Further, organic dispersion media and water-based media other than the silicone dispersion medium can be usable.

The above-mentioned silicone dispersion medium may include silicone oil such as synthetic dimethylpolysiloxanes and cyclic methylpolysiloxine with a low viscosity.

Practical examples of the organic dispersion media other than the silicone dispersion media are (poly)alkylene glycol monoalkyl ethers such as ethylene glycol monomethyl ether, ethylene glycol monoethyl ether, diethylene glycol monomethyl ether, diethylene glycol monoethyl ether, propylene glycol monomethyl ether, and propylene glycol monoethyl ether; (poly) alkylene glycol monoalkyl ether acetates such as ethylene glycol monomethyl ether acetate, ethylene glycol monoethyl ether acetate, and propylene glycol monomethyl ether acetate; ethers such as diethylene glycol diethyl ether, diethylene glycol methyl ethyl ether, and tetrahydrofuran; ketones such as methyl ethyl ketone, methyl isobutyl ketone, cyclohexanone, 2-heptanone, and 3-heptanone; alkyl lactates such as methyl 2-hydroxypropionate and ethyl 2-hydroxypropionate; esters such as ethyl 2-hydroxy-2-methylpropionate, 3-methyl-3-methoxybutyl propionate, methyl 3-methoxypropionate, ethyl 3-ethoxypropionate, ethyl ethoxyacetate, ethyl hydroxyacetatey ethyl acetate, n-butyl acetate, isobutyl acetate, n-butyl propionate, methyl acetoacetate, n-amyl formate, and ethyl pyruvate; hydrocarbons such as aliphatic hydrocarbons, such as normal paraffin hydrocarbons, and iso-paraffin hydrocarbons, alicyclic hydrocarbons such as cycloparaffin hydrocarbons, aromatic hydrocarbons, and halogenated hydrocarbons; amides such as N-methylpyrrolidone, N,N-dimethylformamide, and N,N-dimethylacetamide; and alcohols such as isopropyl alcohols and n-propyl alcohol.

These dispersion media may be used alone or two or more of them may be mixed and used. As the water-based medium, solely water may be used or combinations with a water-compatible organic dispersion media may be employed.

The use amount of the pigment in the above-mentioned pigment dispersion composition is preferably 1 to 97% by weight to the entire solid matter of the pigment dispersion composition, on the basis of weight ratio. The weight ratio of the carbodiimide type compound in the above-mentioned pigment dispersion composition is preferably 2 parts by weight or more and 100 parts by weight or less to 100 parts by weight of the pigment and it is preferable to adjust the ratio in accordance with the uses as the final composition, the quantity of the functional groups reactive or adsorbing on the carbodiimide type compound existing in the pigment surface, dispersibility, fluidity, and required properties.

<Pigment-Resin Composite Fine Particles-Containing Dispersion Composition>

Next, a pigment-resin composite fine particles-containing dispersion composition obtained by finely dispersing pigment-resin composite fine particles will be described.

The above-mentioned pigment-resin composite fine particles-containing dispersion composition may include (1) a composition obtained by dispersing the pigment-resin composite fine particles with the above-mentioned carbodiimide type compound and (2) a composition obtained by dispersing the pigment-resin composite fine particles previously treated with a pigment and a resin with the above-mentioned carbodiimide type compound.

The above-mentioned pigment-resin composite fine particles-containing dispersion composition (1) is obtained by a method of wet pulverizing the pigment-resin composite fine particles containing, for example, a pigment and a thermoplastic resin at a melting point or higher of the above-mentioned carbodiimide type compound in the presence of the carbodiimide type compound and dispersing the particles in the dispersion medium.

The above-mentioned pigment-resin composite fine particles are preferable to contain at least one kind of groups and adsorption parts selected from functional groups having a covalent bond with the carbodiimide type compound, adsorption parts for adsorption owing to the acid-base affinity, and adsorption parts for adsorption owing to the affinity attributed to the analogy of the molecular structures in one or both (preferably both) of the pigment surface and the thermoplastic resin so as to have at least one kind of groups and parts selected from the group consisting of the above-mentioned functional groups and adsorption parts on the surface of the pigment-resin composite fine particles.

Further, the above-mentioned pigment-resin composite fine particles-containing dispersion composition (2) is obtained by a method of melting and kneading the pigment, the thermoplastic resin, and the above-mentioned carbodiimide type compound at a temperature higher than the softening point of the carbodiimide type compound and the thermoplastic resin and thereafter, roughly pulverizing the mixture and further wet-pulverizing the mixture in the dispersion medium.

The above-mentioned pigment and thermoplastic resin are preferable to have at least one kind of groups and adsorption parts selected from functional groups having a covalent bond with the carbodiimide type compound, adsorption parts for adsorption owing to the acid-base affinity, and adsorption parts for adsorption owing to the affinity attributed to the analogy of the molecular structures in one or both (preferably both) of the pigment surface and the thermoplastic resin. In the case of using the covalent bond with the carbodiimide group of the carbodiimide type compound, it is preferable to increase the temperature sufficient to promote the reaction.

With respect to the pigment-resin composite fine particles-containing dispersion composition of the present invention, the carbodiimide type compound to be used as a dispersant may be selected properly from carbodiimide type compounds having the above-mentioned functional groups and functional chains (A) to (D) in accordance with the existence of the functional groups (e.g., a carboxyl group, sulfonic acid group, phosphoric acid group, and hydroxyl) and adsorption parts (acid portion and basic portion) of the pigment-resin composite fine particle surfaces, pigment surface, and the thermoplastic resin, the type of the dispersion medium, and the uses of the obtained pigment-resin composite fine particles-containing dispersion composition.

Further, examples of the pigment to be used for the pigment-resin composite fine particles-containing dispersion composition of the present invention may include organic pigments and inorganic pigments to be used commonly for paints, inks and liquid developers and preferably those having at least one kind of groups and parts selected from the group consisting of the functional groups having a covalent bond with the carbodiimide type compound, adsorption parts for adsorption owing to the acid-base affinity, and adsorption parts for adsorption owing to the affinity attributed to the analogy of the molecular structures.

Examples thereof include pigments having functional groups to be bonded with the carbodiimide group of the above-mentioned carbodiimide type compounds by covalent bond, pigments having adsorption parts owing to the acid-base affinity to the basic nitrogen-containing chain-containing carbodiimide type compounds, and pigments having adsorption parts owing to the analogy of the molecular structure to the carbodiimide type compounds having pigment derivative chains, pigment intermediates, coloring material derivative chains, and coloring material intermediate chains in the molecules.

The thermoplastic resin to be used for the pigment-resin composite fine particles-containing dispersion composition of the present invention may include those obtained by modifying polyolefin resins and introducing a carboxyl group; olefin resins such as ethylene-(meth)acrylic acid copolymer, ethylene-vinyl acetate copolymer, partially saponified ethylene-vinyl acetate copolymer, ethylene-(meth)acrylate copolymer, polyethylene resins, and polypropylene resins; thermoplastic saturated polyester resins; styrene resins such as styrene-acrylic copolymer resins, styrene-acrylic-modified polyester resins; alkyd resins, phenol resins, rosin-modified phenol resins, rosin-modified maleic acid resins, rosin-modified fumaric acid resins, acrylic resins such as (meth)acrylate resins, vinyl chloride resins, vinyl acetate resins, vinylidene chloride resins, fluoro resins, polyamide resins, polyacetal resins, and epoxy resins.

Further, the dispersion medium to be used for the pigment-resin composite fine particles-containing dispersion composition of the present invention may be organic dispersion media and water-based media described above.

Additionally, the pigment-resin composite fine particles-containing dispersion composition may contain various kinds of binder resins, photopolymerizable compounds, solvents, surfactants, and other additives based on the necessity.

"Treatment" in this invention means treatment of entire face or a portion of the pigment surfaces, the pigment-resin composite fine particle surfaces and the entire parts or a portion of the functional groups and/or adsorption parts of the thermoplastic resin having a functional group reactive with the carbodiimide group with the carbodiimide type compound.

The use amount of the pigment in the above-mentioned pigment-resin composite fine particles-containing dispersion composition is 1 to 97% by weight to the entire solid matter of the pigment-resin composite fine particles-containing dispersion composition on the basis of the weight ratio.

The weight ratio of the carbodiimide type compound in the above-mentioned pigment-resin composite fine particles-containing dispersion composition is preferably a weight ratio for dispersing the pigment-resin composite fine particles in the dispersion medium and in the above-mentioned composition (1), it is preferably 1 part by weight or higher and 100 parts by weight or lower to 100 parts by weight of the pigment-resin composite fine particles. In the above-mentioned composition (2), it is preferably 2 parts by weight or higher and 100 parts by weight or lower to 100 parts by weight of the total of the pigment and the resin to obtain the pigment-resin composite fine particles.

<Fine Resin Particles-Containing Dispersion Composition>

The carbodiimide type compound of the present invention can be used also in the case of dispersing fine resin particles other than the above-mentioned pigment dispersion composition and pigment-resin composite fine particles-containing dispersion composition.

In this fine resin particles-containing dispersion composition, the fine resin particles are preferable to contain at least one kind of functional groups having a covalent bond with the carbodiimide type compound, adsorption parts for adsorption owing to the acid-base affinity, and adsorption parts for adsorption owing to the affinity attributed to the analogy of the molecular structures.

With respect to the fine resin particles-containing dispersion composition, the carbodiimide type compound to be used as a dispersant may be selected properly from carbodiimide type compounds having the above-mentioned functional groups and functional chains (A) to (D) in accordance with the existence of the functional groups (e.g., a carboxyl group, a sulfonic acid group, phosphoric acid group, and hydroxyl) and adsorption parts (acid portion and basic portion) of the fine resin particle surfaces, the type of the dispersion medium, and the uses of the obtained fine resin particles-containing dispersion composition.

The weight ratio of the carbodiimide type compound in the fine resin particles-containing dispersion composition of the present invention is preferably 1 part by weight or higher and 100 parts by weight of lower to 100 parts by weight of the fine resin particles and preferably adjusted in accordance with the uses as a final composition, the quantity of the functional groups reacted with and adsorbing the carbodiimide type compound existing in the fine resin particle surfaces, the dispersibility, fluidity, and required properties.

<Liquid Developer>

Next, the liquid developer for use of the final composition of the present invention will be described.

The liquid developer contains the above pigment dispersion composition, or the pigment-resin composite fine particles-containing dispersion composition and contains at least the carbodiimide type compound of the present invention, a pigment, a thermoplastic resin, an insulating organic solvent, and is properly mixed with an additive such as a charge control agent based on the necessity.

The carbodiimide type compound to be used for the liquid developer may be selected properly from the carbodiimide type compounds having the above-mentioned functional groups and functional chains (A) to (C) in accordance with existence of the functional groups and adsorption points of the pigment surface and the type of the dispersion medium. In order to obtain the carbodiimide type compound, in the case of the carbodiimide compound to be used as a starting substance has isocyanate group in the molecule, it is preferable to use those obtained by reaction with polybutadiene diols and polysiloxane diols having functional groups reactive with the isocyanate group.

The pigment composing the liquid developer may be commonly used pigments. Examples of such a pigment my include inorganic pigments such as carbon black, acetylene black, graphite, red iron oxide, chrom yellow, and ultramarine; and organic pigments such as azo pigments, lake pigments, phthalocyanine pigments, isoindoline pigments, anthraquinone pigments, and quinacrylidone pigments. They may be used alone or two or more kinds of them may be used in combination.

Although the content of the pigment in the liquid developer of the present invention is not particularly limited, in terms of the image density, it is preferably 1 to 15 parts by weight in 100 parts by weight of the liquid developer. The liquid developer of the present invention is prepared by diluting the pigment dispersion composition with an insulating organic solvent if necessary to adjust the concentration of the pigment in the above-mentioned concentration.

Examples of the thermoplastic resin composing the liquid developer may include those obtained by modifying polyolefin resins and introducing a carboxyl group; olefin resins such as ethylene-(meth) acrylic acid copolymer, ethylene-vinyl acetate copolymer, partially saponified ethylene-vinyl acetate copolymer, ethylene-(meth)acrylate copolymer, polyethylene resins, and polypropylene resins; thermoplastic saturated polyester resins; styrene resins such as styrene-acrylic copolymer resins, styrene-acrylic-modified polyester resins; alkyd resins, phenol resins, rosin-modified phenol resins, rosin-modified maleic acid resins, rosin-modified fumaric acid resins, acrylic resins such as (meth)acrylate resins, vinyl chloride resins, vinyl acetate resins, vinylidene chloride resins, fluoro resins, polyamide resins, polyacetal resins, and epoxy resins.

As the insulating organic solvent composing the liquid developer are used those having a resistance (about $10^{11}$ to $10^{16}$ Ω·cm) at which electrostatic latent images are not disturbed. Examples thereof include silicone dispersion media such as silicone oil as well as aliphatic hydrocarbons such as normal paraffin hydrocarbons and isoparaffin hydrocarbons; alicyclic hydrocarbons such as cycloparaffin hydrocarbons; aromatic hydrocarbons; and halogenated hydrocarbons. In the present invention, silicone dispersion media are preferable. Examples of the silicone dispersion media include silicone oils such as synthesized dimethylpolysiloxanes and cyclic methylpolysiloxanes with a low viscosity.

The above-mentioned liquid developer may properly contain additives such as a charge control agent, if necessary.

The charge control agent can be broadly classified into two types.

One is a method for coating the surfaces of toner particles with a substance capable of ionizing or adsorbing ions. Examples of this type are fats and oils such as linseed oil and soybean oil; alkyd resins, halogenated polymers, aromatic polycarboxylic acids, acid group-containing water-soluble dyes, and oxidized condensates of aromatic polyamines.

The other type is a method of making a substance soluble in an insulating organic solvent and capable of donating and receiving ion with toner particles and examples thereof include metal soaps such as cobalt naphthate, nickel naphthate, iron naphthate, zinc naphthate, cobalt octate, nickel octate, zinc octate, cobalt dodecylate, nickel dodecylate, zinc dodecylate, and cobalt 2-ethylhexanoate; metal sulfonates such as petroleum metal sulfonates and metal salts of sulfosuccinate; phospholipids such as lecithin; metal salicylates such as tert-butylsalicylic acid metal complexes; polylvinyl pyrrolidone) resins; polyamide resins; sulfonic acid-containing resins; and hydroxybenzoic acid derivatives.

A conventionally known common production method can be employed for producing the liquid developer of the present invention. For example, (1) a liquid developer containing the pigment dispersion composition is produced by a method of wet-pulverizing the pigment and fine resin particles in an insulating organic solvent (preferably a silicone dispersion medium) to be used in the liquid developer of the present invention in the presence of the carbodiimide type compound of the present invention into which the polysiloxane chain is introduced.

Further, (2) a liquid developer containing the pigment-resin composite fine particles-containing dispersion composition is produced by a method of melting and kneading (2-1) a pigment and a thermoplastic resin at a temperature higher than the softening point of the thermoplastic resin by a kneading apparatus such as a roll mill or a kneader, cooling the mixture, and successively pulverizing the mixture to obtain pigment-resin composite fine particles containing the pigment and the thermoplastic resin and thereafter, (2-1-1) wet-pulverizing the pigment-resin composite fine particles in an insulating organic solvent (preferably, a silicone dispersion medium) to be used in the liquid developer of the present invention in the presence of the carbodiimide type compound of the present invention into which the polysiloxane chain is introduced; (2-1-2) wet-pulverizing the particles containing the pigment-resin composite fine particles in an insulating organic solvent (preferably, a silicone dispersion medium) to be used in the liquid developer and successively adding the carbodiimide type compound into which the polysiloxane chain is introduced; (2-2) a method of melting and kneading a pigment, a thermoplastic resin and a carbodiimide type compound of the present invention into which the polysiloxane chain is introduced at a temperature higher than the softening point of the thermoplastic resin and the carbodiimide type compound by a kneading apparatus such as a roll mill or a kneader, cooling the mixture, and successively pulverizing the mixture to obtain pigment-resin composite fine particles containing the pigment and the thermoplastic resin treated with the carbodiimide type compound and thereafter wet-pulverizing the pigment-resin composite fine particles in an insulating organic solvent (preferably, a silicone dispersion medium) to be used in the liquid developer of the present invention.

The apparatus to be used for the wet-pulverization may be a dissolver, a high speed mixer, a homo-mixer, a kneader, a ball mill, a sand mill, and an attriter.

The liquid developer of the present invention should not be limited to the above-mentioned examples.

The carbodiimide type compound of the present invention is obtained by introducing polysiloxane chains therein, so that the carbodiimide type compound can be excellent in the dispersibility and dispersion stability of pigments, fine resin particles, and pigment-resin composite fine particles particularly in a silicone dispersion medium and can have an effect of suppressing decrease of the electric resistance in the case of being used for the liquid developer.

BEST MODE FOR CARRYING OUT THE INVENTION

Hereinafter, the present invention will be described more in detail with reference to Examples, however it is not intended that the present invention be limited to the illustrated Examples. In this specification, % means % by weight and part(s) means part(s) by weight unless otherwise specified.

<Synthesis of Polysiloxane Resin Having an Acid Group at One Terminal>

PREPARATION EXAMPLE 1

(Polysiloxane having an Acid Group at One Terminal and having a Molecular Weight of 2000)

A four neck flask equipped with a nitrogen gas-introducing pipe, a stirrer, a titration funnel, and a thermometer was loaded with 45 parts of toluene, 10 parts of 3-mercaptopropionic acid, and 180 parts of polydimethylsiloxane having a molecular weight of 1000 and methacryloyl group at one terminal and the mixture was heated to 85° C. While the inner temperature was kept at 85° C., a mixture containing 80 parts of toluene and 1.9 parts of azobisisobutyronitrile was dropwise added for 2 hours. After that, while the inner temperature was kept at 85° C., the resulting mixture was stirring for 2 hours to obtain a carboxyl-containing polysiloxane resin 1 containing 60% of solid matter.

PREPARATION EXAMPLE2

(Polysiloxane having an Acid Group at One Terminal and having a Molecular Weight of 3000)

A four neck flask equipped with a nitrogen gas-introducing pipe, a stirrer, a titration funnel, and a thermometer was loaded with 45 parts of toluene, 6.6 parts of 3-mercaptopropionic acid, and 180 parts of polydimethylsiloxane having a molecular weight of 1000 and methacryloyl group at one terminal and the mixture was heated to 85° C. While the inner temperature was kept at 85° C., a mixture containing 78 parts of toluene and 1.9 parts of azobisisobutyronitrile was dropwise added for 2 hours. After that, while the inner temperature was kept at 85° C., the resulting mixture was stirring for 2 hours to obtain a carboxyl-containing polysiloxane resin 2 containing 60% of solid matter.
<Synthesis of Carbodiimide Type Compound having Polysiloxane Chain>

EXAMPLE 1

(Molecular Weight of Graft Chain 2000, Grafting Ratio 50%)

A four neck flask equipped with a nitrogen gas-introducing pipe, a stirrer, and a thermometer was loaded with 114.8 parts of a toluene solution containing an isocyanate group-containing polycarbodiimide compound (carbodiimide equivalent weight: 316, solid matter: 50%) and 11.1 parts of methyldiethanolamine and the mixture was kept to about 100° C. for 3 hours to cause reaction of the isocyanate group and hydroxyl and successively, 306.5 parts of the polysiloxane resin 1 obtained in Preparation example 1 was loaded and kept at about 80° C. for 2 hours to cause reaction of carbodiimide group and carboxyl and after that, the toluene was removed in reduced pressure to obtain the carbodiimide type compound 1 (carbodiimide equivalent weight: 2774, theoretical number average molecular weight: 10903).

EXAMPLE 2

(Molecular Weight of Graft Chain 3000, Grafting Ratio 50%)

A four neck flask equipped with a nitrogen gas-introducing pipe, a stirrer, and a thermometer was loaded with 99.0 parts of a toluene solution containing an isocyanate group-containing polycarbodiimide compound (carbodiimide equivalent weight: 316, solid matter: 50%) and 9.5 parts of methyldiethanolamine and the mixture was kept to about 100° C. for 3 hours to cause reaction of the isocyanate group and hydroxyl and successively, 393.1 parts of the polysiloxane resin 2 obtained in Preparation example 2 was loaded and kept at about 80° C. for 2 hours to cause reaction of carbodiimide group and carboxyl and after that, the toluene was removed in reduced pressure to obtain the carbodiimide type compound 2 (carbodiimide equivalent weight: 3758, theoretical number average molecular weight: 14771).

As a comparative pigment dispersant was used Solsperse 17000 (manufactured by Avecia Biologics Limited).

EXAMPLE 3

A pigment dispersion composition 1 containing 21.2% of solid matter was obtained by kneading 140 parts of Pigment Blue 15:3, 10.5 parts of the carbodiimide type compound 1, and 560 parts of dimethylpolysiloxane at a temperature of 40° C. for 2 hours using an Eiger-motor mill (trade name; M-250) filled with zirconia beads with a diameter of 0.5 mm$\phi$.

COMPARATIVE EXAMPLE 1

Although it was tried to knead 140 parts of Pigment Blue 15:3, 10.5 parts of the comparative pigment dispersant, and 560 parts of dinethylpolysiloxane at a temperature of 40° C. using an Eiger-motor mill (trade name; M-250) filled with zirconia beads with a diameter of 0.5 mm$\phi$, the viscosity became too high to promote the kneading.

COMPARATIVE EXAMPLE 2

Although it was tried to knead 140 parts of Pigment Blue 15:3 and 570.5 parts of dimethylpolysiloxane at a temperature of 40° C. using an Eiger-motor mill (trade name; M-250) filled with zirconia beads with a diameter of 0.5 mm$\phi$, the viscosity became too high to promote the kneading.
<Evaluation>
(Viscosity)

The viscosity of the pigment dispersion composition 1 of Example 3 at 25° C. was measured by an E type viscometer (5 rpm) and the viscosity value after 60 seconds was defined as the viscosity.
Measurement Results
Example 3: 1.2 poise (0.12 Pa·s)
Comparative Example 1: the viscosity became too high to carry out the measurement.
Comparative Example 2: the viscosity became too high to carry out the measurement.

EXAMPLE 4

Preparation of Liquid Developer 1

After a kneaded mixture obtained by melting and kneading 250 parts of Pigment Blue 15:3 and 750 parts of an epoxy resin (AER 6064, manufactured by ASAHI KASEI CORPORATION) at 130° C. using three hot rolls was cooled, the mixture was pulverized. Next, 140 parts of the pulverized product, 10.5 parts of the carbodiimide type compound 1, and 560 parts of dimethylpolysiloxane were wet-pulverized at a temperature of 40° C. for 2 hours using an Eiger-motor mill (trade name; M-250) filled with zirconia beads with a diameter of 0.5 mm$\phi$ to obtain a liquid developer 1 with a solid matter concentration of 21.2% by weight.

EXAMPLE 5

Preparation of Liquid Developer 2

After a kneaded mixture obtained by melting and kneading 250 parts of Pigment Blue 15:3 and 750 parts of an epoxy resin (AER 6064, manufactured by ASAHI KASEI CORPO- RATION) at 130° C. using three hot rolls was cooled, the mixture was pulverized. Next, 140 parts of the pulverized product, 21.0 parts of the carbodiimide type compound 1, and 597 parts of dimethylpolysiloxane were wet-pulverized at a temperature of 40° C. for 2 hours using an Eiger-motor mill (trade name; M-250) filled with zirconia beads with a diameter of 0.5 mmφ to obtain a liquid developer 2 with a solid matter concentration of 21.2% by weight.

EXAMPLE 6

Preparation of Liquid Developer 3

After a kneaded mixture obtained by melting and kneading 250 parts of Pigment Blue 15:3 and 750 parts of an epoxy resin (AER 6064, manufactured by ASAHI KASEI CORPORATION) at 130° C. using three hot rolls was cooled, the mixture was pulverized. Next, 140 parts of the pulverized product, 10.5 parts of the carbodiimide type compound 2, and 560 parts of dimethylpolysiloxane were wet-pulverized at a temperature of 40° C. for 2 hours using an Eiger-motor mill (trade name; M-250) filled with zirconia beads with a diameter of 0.5 mmφ to obtain a liquid developer 3 with a solid matter concentration of 21.2% by weight.

PREPARATION EXAMPLE 3

Preparation of Acrylic Thermoplastic Resin 1

At first, 76.7 parts of styrene (St), 14.7 parts of stearyl methacrylate (SMA), 8.6 parts of dimethylacrylamide (DMAA), 160 parts of toluene, and as an initiator, 1.5 parts of azobisisobutyronitrile were mixed and radical polymerization was carried out at 80° C. for 10 hours. The obtained resin solution was further heated at 150° C. for 8 hours in reduced pressure (70 cmHg≅93 kPa) to remove toluene, un-reacted monomer and low molecular weight oligomers and obtain an acrylic thermoplastic resin 1. The obtained resin had a composition (St:SMA:DMAA=85:5:10, by mole) and a weight average molecular weight of 45800 and a melting point of 92° C.

EXAMPLE 7

Preparation of Liquid Developer 4

After a kneaded mixture obtained by melting and kneading 250 parts of Pigment Blue 15:3 and 750 parts of the acrylic thermoplastic resin 1 at 130° C. using three hot rolls was cooled, the mixture was pulverized. Next, 140 parts of the pulverized product, 10.5 parts of the carbodiimide type compound 1, and 560 parts of dimethylpolysiloxane were wet-pulverized at a temperature of 40° C. for 2 hours using an Eiger-motor mill (trade name; M-250) filled with zirconia beads with a diameter of 0.5 mmφ to obtain a liquid developer 4 with a solid matter concentration of 21.2% by weight.

COMPARATIVE EXAMPLE 3

Preparation of Liquid Developer 5

After a kneaded mixture obtained by melting and kneading 250 parts of Pigment Blue 15:3 and 750 parts of an epoxy resin (AER 6064, manufactured by ASAHI KASEI CORPORATION) at 130° C. using three hot rolls was cooled, the mixture was pulverized. Next, 140 parts of the pulverized product, 10.5 parts of the comparative pigment dispersant, and 560 parts of dimethylpolysiloxane were wet-pulverized at a temperature of 40° C. for 2 hours using an Eiger-motor mill (trade name; M-250) filled with zirconia beads with a diameter of 0.5 mmφ to obtain a liquid developer 5 with a solid matter concentration of 21.2% by weight.

Comparative Example 4

Preparation of Liquid Developer 6

After a kneaded mixture obtained by melting and kneading 250 parts of Pigment Blue 15:3 and 750 parts of an epoxy resin (AER 6064, manufactured by ASAHI KASEI CORPORATION) at 130° C. using three hot rolls was cooled, the mixture was pulverized. Next, 140 parts of the pulverized product and 560 parts of dimethylpolysiloxane were wet-pulverized at a temperature of 40° C. for 2 hours using an Eiger-motor mill (trade name; M-250) filled with zirconia beads with a diameter of 0.5 mmφ to obtain a liquid developer 6 with a solid matter concentration of 20% by weight.

<Evaluation>
(Viscosity)

The respective viscosities of the liquid developers 1 to 6 of Examples 4 to 7 and Comparative Examples 3 and 4 at 25° C. were measured by an E type viscometer (5 rpm) and the viscosity value after 60 seconds was defined as the viscosity.
Measurement Results
Example 4: 1.0 poise (0.1 Pa·s)
Example 5: 0.6 poise (0.06 Pa·s)
Example 6: 1.0 poise (0.1 Pa·s)
Example 7: 1.0 poise (0.1 Pa·s)
Comparative Example 3 and Comparative Example 4: the viscosity became too high to carry out the measurement.
(Electric Resistance Value)

The electric resistance values of the liquid developers 1 to 4 of Examples 4 to 7 whose viscosity measurement was possible were measured by R834 manufactured by Advance Co., Ltd.
Measurement Results
Example 4: $1.5 \times 10^{13}$ Ω·cm
Example 5: $4.5 \times 10^{10}$ Ω·cm
Example 6: $1.2 \times 10^{13}$ Ω·cm
Example 7: $1.3 \times 10^{13}$ Ω·cm
The electric resistance values of the liquid developers 1 to 4 of Examples 4 to 7 were all $10^{10}$ Ω·cm or higher, which is usable as a liquid developer.
(Average Particle Diameter)

The average particle diameters of the toner particles of the liquid developers 1 to 4 of Examples 4 to 7 were measured by Microtrack particle diameter measurement apparatus (UPA 150, 9230 UPA, manufactured by LEED & NORTHRUP COMPANY). It was impossible to carry out the measurement for the liquid developers 5 and 6 of Comparative Examples 3 and 4 because of too large toner particle diameters.
Measurement Results
Example 4: 2.0 μm
Example 5: 2.0 μm
Example 6: 2.2 μm
Example 7: 2.1 μm

The invention claimed is:

1. A liquid developer containing a pigment dispersion, the pigment dispersion composition comprises a silicon dispersion medium containing a carbodiimide compound wherein the carbodiimide compound comprises a polysiloxane chain as a side chain, and wherein the polysiloxane chain is introduced by reaction of a functional group of a polysiloxane chain-containing compound having the functional group reactive with a carbodiimide group with a carbodiimide group of a carbodiimide compound having a carbodiimide equivalent weight of 100 to 50000, wherein a polysiloxane chain-containing polymer comprising an acid group in one terminal of the molecule and obtained by polymerization of a no acid group-containing radical polymerizable compound containing at least one kind of no acid group-containing polysiloxanes having radical polymerizable unsaturated bonds at the terminals in the presence of a thiol acid group-containing chain transfer agent is used as said polysiloxane chain-containing compound.

2. The liquid developer according to claim 1, wherein the carbodiimide compound has a carbodiimide group in the molecule.

3. The liquid developer according to claim 1, wherein the carbodiimide compound further comprises at least one kind of chains selected from the group consisting of basic nitrogen-containing chains, pigment derivative chains, pigment intermediate chains, coloring material derivative chains, and coloring material intermediate chains.

4. A liquid developer containing a pigment-resin composite fine particles-containing dispersion composition, the pigment-resin composite fine particles-containing dispersion composition comprises a silicon dispersion medium containing a carbodiimide compound wherein the carbodiimide compound comprises a polysiloxane chain as a side chain, and wherein the polysiloxane chain is introduced by reaction of a functional group of a polysiloxane chain-containing compound having the functional group reactive with a carbodiimide group with a carbodiimide group of a carbodiimide compound having a carbodiimide equivalent weight of 100 to 50000, wherein a polysiloxane chain-containing polymer comprising an acid group in one terminal of the molecule and obtained by polymerization of a no acid group-containing radical polymerizable compound containing at least one kind of no acid group-containing polysiloxanes having radical polymerizable unsaturated bonds at the terminals in the presence of a thiol acid group-containing chain transfer agent is used as said polysiloxane chain-containing compound.

5. The liquid developer according to claim 4, wherein the carbodiimide compound has a carbodiimide group in the molecule.

6. The liquid developer according to claim 4, wherein the carbodiimide compound further comprises at least one kind of chains selected from the group consisting of basic nitrogen-containing chains, pigment derivative chains, pigment intermediate chains, coloring material derivative chains, and coloring material intermediate chains.

\* \* \* \* \*